(12) United States Patent
Trott et al.

(10) Patent No.: US 11,620,572 B2
(45) Date of Patent: Apr. 4, 2023

(54) SOLVING SPARSE REWARD TASKS USING SELF-BALANCING SHAPED REWARDS

(71) Applicant: salesforce.com, inc., San Francisco, CA (US)

(72) Inventors: Alexander Richard Trott, San Francisco, CA (US); Stephan Tao Zheng, Redwood City, CA (US)

(73) Assignee: salesforce.com, inc., San Francisco, CA (US)

( * ) Notice: Subject to any disclaimer, the term of this patent is extended or adjusted under 35 U.S.C. 154(b) by 764 days.

(21) Appl. No.: 16/545,279

(22) Filed: Aug. 20, 2019

(65) Prior Publication Data

US 2020/0364614 A1 Nov. 19, 2020

Related U.S. Application Data

(60) Provisional application No. 62/852,179, filed on May 23, 2019, provisional application No. 62/849,036, filed on May 16, 2019.

(51) Int. Cl.
| | |
|---|---|
| *G06Q 30/00* | (2012.01) |
| *G06N 20/00* | (2019.01) |
| *G06K 9/62* | (2022.01) |
| *G06F 17/18* | (2006.01) |

(52) U.S. Cl.
CPC .......... *G06N 20/00* (2019.01); *G06K 9/6215* (2013.01); *G06F 17/18* (2013.01)

(58) Field of Classification Search
None
See application file for complete search history.

(56) References Cited

U.S. PATENT DOCUMENTS

| | | |
|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 10,542,270 B2 | 1/2020 | Zhou et al. |

(Continued)

OTHER PUBLICATIONS

Andrychowicz et al., "Hindsight Experience Replay," In Conference on Neural Information Processing Systems (NIPS), 2017.

(Continued)

*Primary Examiner* — Matthew T Sittner
(74) *Attorney, Agent, or Firm* — Haynes and Boone LLP

(57) ABSTRACT

Approaches for using self-balancing shaped rewards include randomly selecting a start and goal state, traversing first and second trajectories for moving from the start state toward the goal state where a first terminal state of the first trajectory is closer to the goal state than a second terminal state of the second trajectory, updating rewards for the first and trajectories using a self-balancing reward function based the terminal states of the other trajectory, determining a gradient for the goal-oriented task module, and updating one or more parameters of the goal-oriented task module based on the gradient. The second trajectory contributes to the determination of the gradient and the first trajectory contributes to the determination of the gradient when the first terminal state is within a first threshold distance of the second terminal state or the first terminal state is within a second threshold distance of the goal state.

20 Claims, 9 Drawing Sheets

(56) References Cited

U.S. PATENT DOCUMENTS

| | | | |
|---|---|---|---|
| 10,546,217 B2 | 1/2020 | Albright et al. | |
| 2005/0138413 A1* | 6/2005 | Lippmann | H04L 63/1433 726/4 |
| 2006/0136922 A1* | 6/2006 | Zimberg | G06Q 10/06 718/100 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Hosseini-Asl et al. | |
| 2019/0295530 A1 | 9/2019 | Hosseini-Asl et al. | |
| 2019/0362020 A1 | 11/2019 | Paulus et al. | |

OTHER PUBLICATIONS

Bellemare et al., "Unifying Count-Based Exploration and Intrinsic Motivation," In Conference on Neural Information Processing Systems (NIPS), 2016.

Bengio et al., "Curriculum Learning," In International Conference on Machine Learning (ICML), 2009, pp. 41-48.

Burda et al., "Exploration by Random Network Distillation," arXiv, 2018b.

Burda et al., "Large-Scale Study of Curiosity-Driven Learning," arXiv, 2018a.

Chou et al., "Improving Stochastic Policy Gradients in Continuous Control With Deep Reinforcement Learning Using the Beta Distribution," In International Conference on Machine Learning (ICML), 2017, pp. 834-843.

Clark et al., "Faulty Reward Functions in the Wild," https://openai.com/blog/faulty-reward-functions/, 2016.

Espeholt et al., "IMPALA: Scalable Distributed Deep-RL With Importance Weighted Actor-Learner Architectures," In International Conference on Machine Learning (ICML), 2018.

Eysenbach et al., "Diversity Is All You Need: Learning Skills without a Reward Function," In International Conference on Learning Representations (ICLR), 2019.

Florensa et al., "Automatic Goal Generation for Reinforcement Learning Agents," In International Conference on Machine Learning (ICML), 2018, pp. 1515-1528.

Ghosh et al., "Learning Actionable Representations With Goal-Conditioned Policies," arXiv, 2018.

Haarnoja et al., "Reinforcement Learning With Deep Energy-Based Policies," In International Conference on Machine Learning (ICML), 2017, pp. 1352-1361.

Johnson et al., "The Malmo Platform for Artificial Intelligence Experimentation," In International Joint Conference on Artificial Intelligence (IJCAI), 2016, pp. 4246-4247.

Kaelbling, "Learning to Achieve Goals," In International Joint Conference on Artificial Intelligence (IJCAI), 1993.

Lillicrap et al., "Continuous Control With Deep Reinforcement Learning," In International Conference on Learning Representations (ICLR), 2016.

LIU et al., "Competitive Experience Replay," In International Conference on Learning Representations (ICLR), 2019.

Mataric, "Reward Functions for Accelerated Learning," In International Conference on International Conference on Machine Learning (ICML), 1994, pp. 181-189.

Mnih et al., "Human-Level Control Through Deep Reinforcement Learning," Nature, 2015, pp. 529-533.

Molchanov et al., "Region Growing Curriculum Generation for Reinforcement Learning," arXiv, 2018.

Nachum et al., "Data-Efficient Hierarchical Reinforcement Learning," In Neural Information Processing Systems (NIPS), 2018, pp. 3307-3317.

Nair et al., "Visual Reinforcement Learning With Imagined Goals," In Neural Information Processing Systems (NIPS), 2018, pp. 9209-9220.

Ng et al., "Policy Invariance Under Reward Transformations: Theory and Application to Reward Shaping," In International Conference on Machine Learning (ICML), 1999, pp. 278-287.

Pathak et al., "Curiosity-Driven Exploration by Self-Supervised Prediction," In International Conference on Machine Learning (ICML), 2017.

Pere et al., "Unsupervised Learning of Goal Spaces for Intrinsically Motivated Goal Exploration," In International Conference on Learning Representations (ICLR), 2018.

Schaul et al., "Universal Value Function Approximators," In International Conference on Machine Learning (ICML), 2015, pp. 1312-1320.

Schulman et al., "Proximal Policy Optimization Algorithms," arXiv, 2017.

Silver et al., "A General Reinforcement Learning Algorithm That Masters Chess, Shogi, and Go Through Self-Play," Science, 2018, pp. 1140-1144.

Sukhbaatar et al., "Intrinsic Motivation and Automatic Curricula via Asymmetric Self-Play," In International Conference on Learning Representations (ICLR), 2018b.

Sukhbaatar et al., "Learning Goal Embeddings via Self-Play for Hierarchical Reinforcement Learning," arXiv, 2018a.

Sutton et al., "Horde: A Scalable Real-time Architecture for Learning Knowledge from Unsupervised Sensorimotor Interaction," Categories and Subject Descriptors, In Autonomous Agents and Multiagent Systems (AAMAS), 2011, pp. 761-768.

Tang et al., "Exploration: A Study of Count-Based Exploration for Deep Reinforcement Learning," In Neural Information Processing Systems (NIPS), 2017, pp. 2750-2759.

Todorov et al., "MuJoCo: A Physics Engine for Model-Based Control," IEEE International Conference on Intelligent Robots and Systems, 2012. ISSN 21530858.

Warde-Farley et al., "Unsupervised Control Through Non-Parametric Discriminative Rewards," In International Conference on Learning Representations (ICLR), 2019.

Zhao et al., "Curiosity-Driven Experience Prioritization via Density Estimation," In NeurIPS Deep RL Workshop, 2018.

* cited by examiner

Given:
- Environment, Goal-reaching task w/ $S, G, A, \rho(s_0, g), d(\cdot, \cdot), \delta$ and max episode length
- Policy $\pi : S \times G \times A \to [0, 1]$ and Critic $V : S \times G \times G \to \mathbb{R}$ with parameters $\theta$ and on-policy learning algorithm $\mathbb{A}$
- Inclusion threshold $\epsilon$ for $cycle = 1..K$ do
  Initialize transition buffer $D$
  for $episode = 1..M$ do
    Sample $s_0, g \sim \rho$
    $\tau^a \leftarrow \pi_\theta(\cdot, \cdot)|_{s_0, g}$    # Collect rollout
    $\tau^b \leftarrow \pi_\theta(\cdot, \cdot)|_{s_0, \tilde{g}}$    # Collect sibling rollout
    Relabel $\tau^a$ reward using $r^j$ and $\tilde{s} \leftarrow s_T^b$
    Relabel $\tau^b$ reward using $r^j$ and $\tilde{s} \leftarrow s_T^a$
    if $d(s_T^a, s_T^b) < d(s_T^a, g)$ then
      $\tau^c \leftarrow \tau^a$
      $\tau^f \leftarrow \tau^b$
    else
      $\tau^c \leftarrow \tau^b$
      $\tau^f \leftarrow \tau^a$
    if $d(s_T^a, s_T^b) < \epsilon$ or $d(s_T^c, g) < \delta$ then
      Add $\tau^f$ and $\tau^c$ to buffer $D$
    else
      Add $\tau^f$ to buffer $D$
  Apply on-policy algorithm $\mathbb{A}$ to update $\theta$ using examples in $D$

FIG. 4

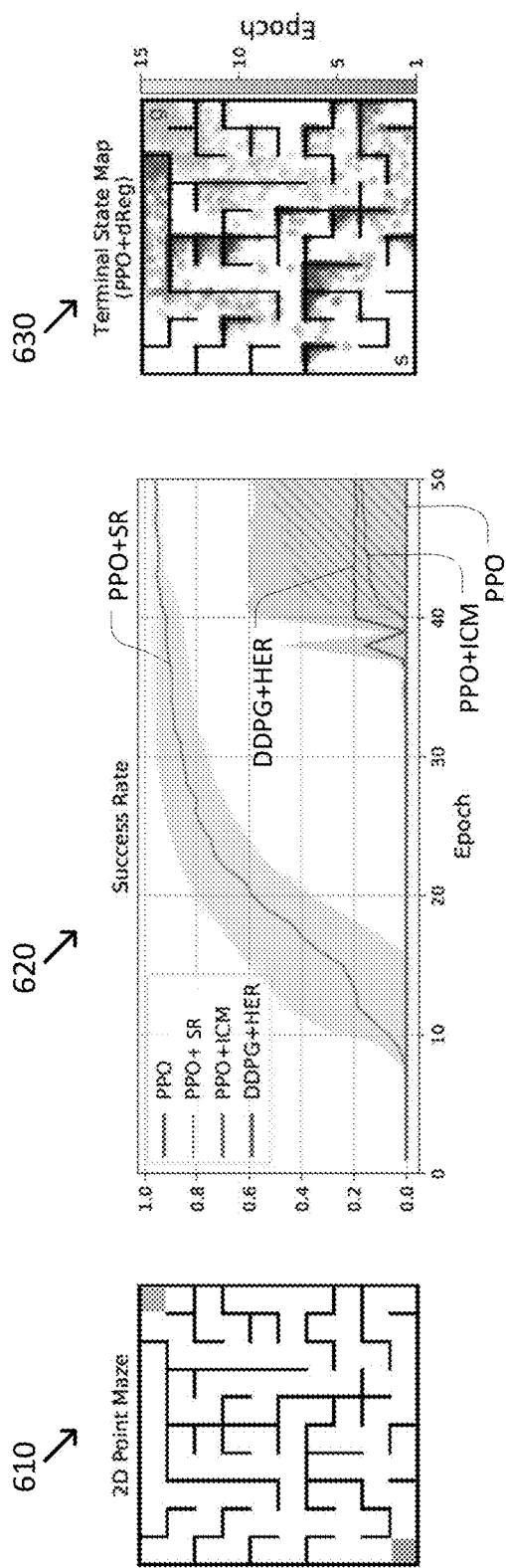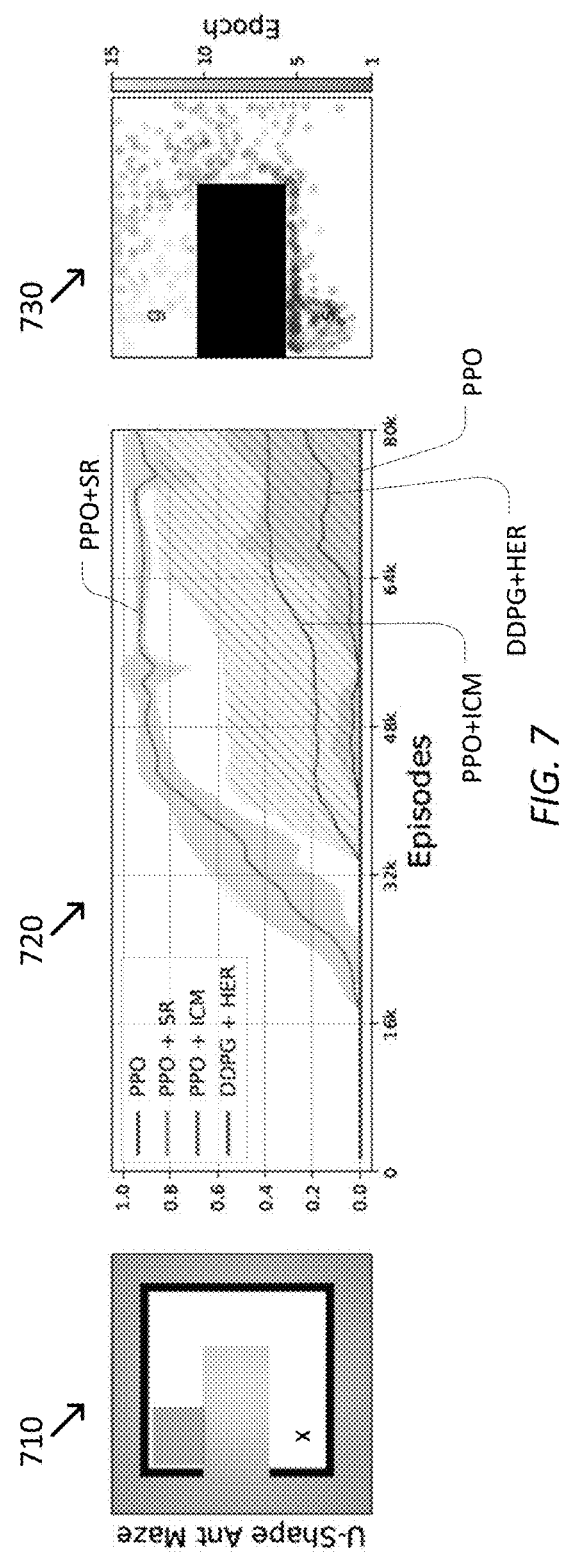
FIG. 6
FIG. 7

| Hyperparameter | Point maze | | | Ant maze (high) | | | Bit flipping | | |
| --- | --- | --- | --- | --- | --- | --- | --- | --- | --- |
| | PPO | +SR | +ICM | PPO | +SR | +ICM | PPO | +SR | +ICM |
| Rollouts per Update | 4 | | | 4 | | | 4 | | |
| Epochs per Update | 4 | | | 2 | | | 4 | | |
| m.Batches per Epoch | 4 | | | 4 | | | 4 | | |
| Learning Rate (LR) | 0.001 | | | 0.001 | | | 0.001 | | |
| LR Decay | 0.999 | | | 1.0 | | | 0.999 | | |
| Entropy Reg $\lambda$ | 0.025 | | | 0.025 | | | 0.025 | 0.0 | 0.025 |
| GAE $\lambda$ | 0.98 | | | 0.98 | | | 0.98 | | |
| Bootstrap Value | N | Y | | N | Y | | N | Y | |
| Discount Factor | 1.0 | 0.98 | | 1.0 | 0.98 | | 1.0 | 0.98 | |
| Inclusion thresh. ($c$) | | 5.0 | | | 10.0 | | | 0.0 | |

FIG. 11

| Hyperparameter | Point maze | Ant maze (high) | Bit flipping |
| --- | --- | --- | --- |
| Rollouts per Update | 4 | | |
| m.Batches per Update | 40 | | |
| m.Batches size | 64 | 128 | 128 |
| Learning Rate (LR) | 0.001 | | |
| Action $L_2$ $\lambda$ | 0.25 | 0.0002 | NA |
| Behavior action noise | $0.1 \times$ action range | | NA |
| Behavior action epsilon | 0.2 | | |
| Polyak coefficient | 0.95 | | |
| Bootstrap Value | Y | | |
| Discount Factor | 0.98 | | |

FIG. 12

| Setting | $S \in$ | $G \in$ | $A \in$ |
|---|---|---|---|
| Point maze | $\mathbb{R}^2$ | $\mathbb{R}^2$ | $[-0.95, 0.95]^2$ |
| Ant maze (high) | $\mathbb{R}^{30}$ | $\mathbb{R}^2$ | $[-5, 5]^2$ |
| Ant maze (low) | $\mathbb{R}^{30}$ | $\mathbb{R}^2$ | $[-30, 30]^8$ |
| Bit flipping | $\{0,1\}^{13 \times 13 \times 2}$ | $\{0,1\}^{13 \times 13}$ | $\{0...9\}$ |
| Minecraft | $s^o \in \mathbb{R}^{80 \times 120 \times 3}$, $s^c \in \{0...N_b\}^{11 \times 11 \times 3}$ | $\{0...N_b\}^{11 \times 11 \times 3}$ | $\{0...20\}$ |

FIG. 13

| Setting | $m(s)$ | $d(\cdot)$ | $\delta$ | Max. $T$ |
|---|---|---|---|---|
| Point maze | $I$ | $L_2$ | 0.15 | 50 |
| Ant maze (high) | $[s^0, s^1]$ | $L_2$ | 1.0 | 25 (=500 env steps) |
| Ant maze (low) | $[s^0, s^1]$ | $L_2$ | NA | 20 (env steps) |
| Bit flipping | $s^{i,j,0}$ | $L_1$ | 0.0 | 50 |
| Minecraft | $s^c$ | $\sum x_{ijk} \neq y_{ijk}$ | 0.0 | 100 |

FIG. 14

SOLVING SPARSE REWARD TASKS USING SELF-BALANCING SHAPED REWARDS

RELATED APPLICATIONS

This application claims priority to U.S. Provisional Patent Application No. 62/852,179 filed on May 23, 2019 and U.S. Provisional Patent Application No. 62/849,036 filed on May 16, 2019, each of which is incorporated by reference herein.

TECHNICAL FIELD

The present disclosure relates generally to training and use of machine learning systems and more specifically solving sparse reward tasks using self-balancing shaped rewards.

BACKGROUND

While using shaped rewards can be beneficial when solving sparse reward tasks, their successful application often includes careful engineering and is problem specific. For example, naive approaches based on distance-to-goal reward functions often find solutions based on a local optimum rather than a more desirable global optimum. To address these issues, developers often enhance the reward functions based on problem-specific knowledge. This approach, however, does not generalize well and is only as good as the problem-specific reward functions.

Accordingly, it would be advantageous to have systems and methods for training deep learning systems for sparse reward tasks that do not require specially crafted problem-specific reward functions.

BRIEF DESCRIPTION OF THE DRAWINGS

FIG. 4 is a simplified diagram of the method of FIG. 3 in algorithmic form according to some embodiments.

FIGS. 6-9 are simplified diagrams of other goal-oriented tasks and the learning of corresponding goal-oriented task modules according to some embodiments.

FIG. 11 is a simplified diagram of implementation parameters for proximal policy optimization according to some embodiments.

FIG. 12 is a simplified diagram of implementation parameters for off-policy approaches according to some embodiments.

FIGS. 13 and 14 are simplified diagrams of implementation parameters for the goal-oriented tasks of FIGS. 2 and 5-9 according to some embodiments.

Figure 1:
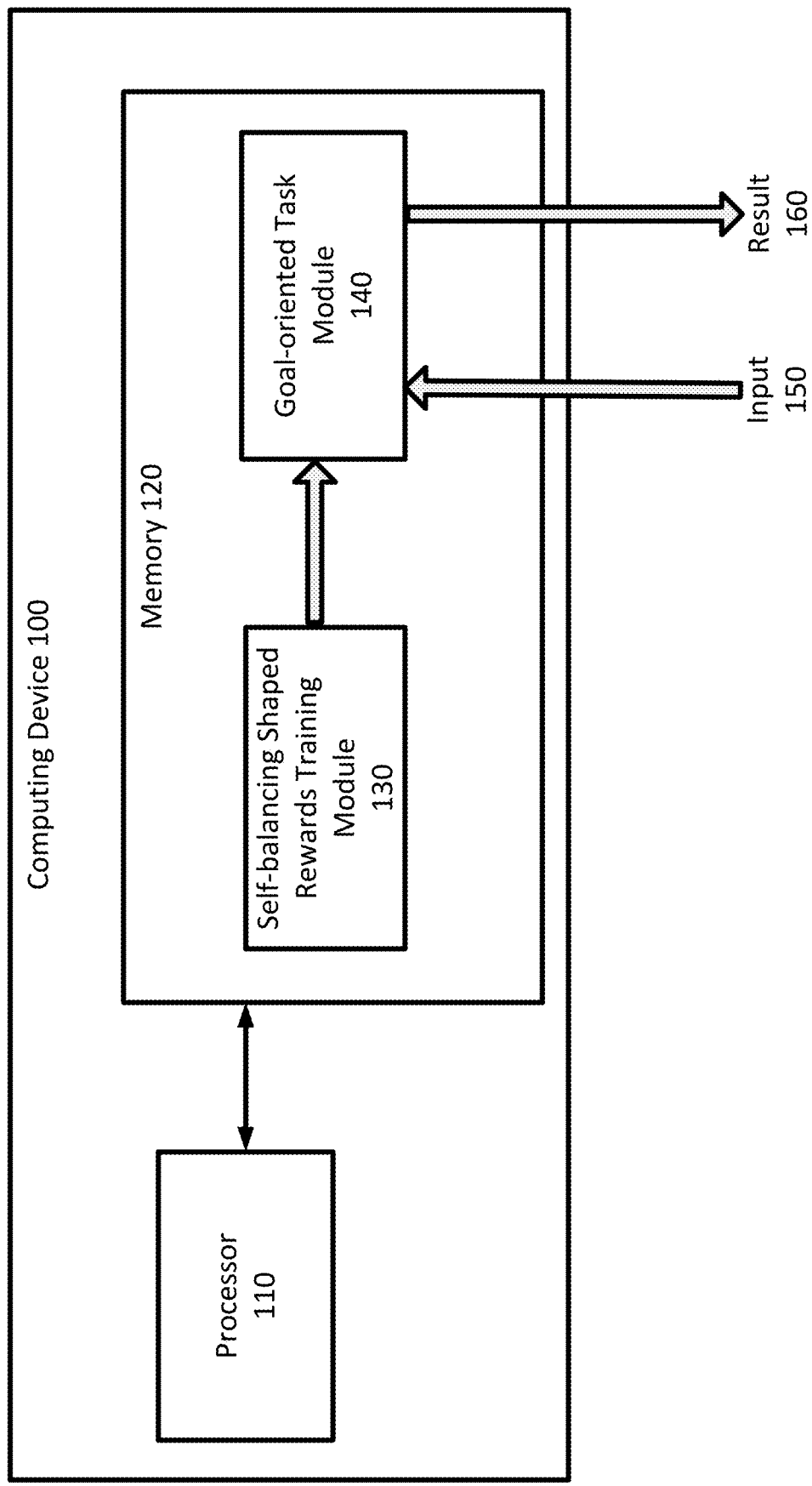
FIG. 1 is a simplified diagram of a computing device according to some embodiments.

In the figures, elements having the same designations have the same or similar functions.

DETAILED DESCRIPTION

This application introduces a simple and effective model-free method to learn from shaped distance-to-goal rewards on tasks where success depends on reaching a goal state. The described approaches introduce an auxiliary distance-based reward based on pairs of rollouts to encourage diverse exploration. These approaches effectively de-stabilize local optima induced by the naive distance-to-goal reward shaping while enabling policies to efficiently solve the sparse reward task. Using an augmented objective does not involve any additional reward engineering or domain expertise to implement. These approaches are able to successfully solve a variety of hard-exploration tasks, such as maze navigation, 3D construction in a Minecraft environment, and/or the like, where naive distance-based reward shaping otherwise fails, and curiosity and reward relabeling strategies exhibit poor performance.

Reinforcement Learning (RL) offers a powerful framework for teaching an agent to perform some task using only observations from its environment. The goal of RL is to learn a policy that maximizes the reward received by the agent; for many real-world problems, this requires engineering a reward function that aligns with the task at hand. Designing a well-suited sparse reward function typically includes defining the criteria for achieving the task for which reward is provided if the criteria are met and withheld otherwise.

While designing a suitable sparse reward may be straightforward, learning from it within a practical amount of time often is not and often requires exploration heuristics to help discover a suitable sparse reward. Other approaches use a shaped reward and can be used to express preference over failed rollouts, based on which rollouts made more progress towards a successful outcome. In some examples, this may simplify some aspects of learning, but whether the learned behavior improves task performance depends on careful design of the shaped reward. As such, shaped rewards shift the burden to domain-expertise and are often problem specific.

Goal-oriented tasks provide an interesting extension of the traditional RL framework. Such tasks typically require a goal-oriented task module to deal with episode-specific goals. In cases where each goal can be associated with some state(s) of the environment, distance-to-goal becomes a natural metric to express the success of a particular episode or attempt to complete the task. Distance-to-goal can similarly be used as a shaped reward. In this case, the sparse and shaped versions of the distance-to-goal reward have equivalent requirements with regard to domain-expertise (namely, in choosing the distance metric). However, such shaped rewards introduce a new potential problem: local optima. Because the locations and attractiveness of local optima depend highly on the environment and task definition, solutions to deal with them quickly become problem specific.

To address this, a simple and effective, generally-applicable, model-free approach to address the limitations of using distance-to-goal as a shaped reward is described. According to some embodiments, the naive distance-based shaped reward (which renders learning vulnerable to local optima) is extended to handle sibling trajectories, pairs of independently sampled trajectories using the same policy, starting state, and goal. The approach, which is simple to implement, may be interpreted as a type of self-balancing reward that encourages behaviors that make progress towards the goal and simultaneously use sibling rollouts to estimate the local optima and encourage behaviors that avoid the local optima, effectively balancing exploration and exploitation. This objective helps to de-stabilize local optima without introducing new stable optima, preserving the task definition given by the sparse reward. According to some embodiments, this approach combines the learnability of shaped rewards with the generality of sparse rewards, which are demonstrated through its successful application on a variety of environments that support goal-oriented tasks.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a self-balancing rewards training module 130 and a goal-oriented task module 140. Self-balancing rewards training module 130 may be used to supervise the training of goal-oriented task module 140 using a self-balancing rewards training approach. According to some embodiments, self-balancing rewards training module 130 may iteratively use a sibling rivalry approach to control how the gradient for the goal-oriented task module 140 is generated and then used to update the parameters of goal-oriented task module 140. In some examples, the sibling rivalry approach for each training cycle selects a number of random start state and random goal state pairs for a problem applicable to goal-oriented task module 140. A pair of two sibling trajectories from the start state toward the goal state are generated for each start state and goal state pair. The terminal state for reach of the sibling trajectories are then used to update (e.g., relabel) the reward of each of the sibling trajectories based on a self-balancing reward function. A selective determination is made as to which of the sibling trajectories are used to in the computation of the gradient of the parameters of goal-oriented task module 140 for the current training cycle as is described in further detail below.

Goal-oriented task module 140 may be used to solve any goal-oriented task. As shown, goal-oriented task module 140 receives one or more inputs 150 and generates one or more outputs 160. In some examples, the one or more inputs 150 may correspond to a starting state and a desired goal state and the one or more outputs 160 may correspond to a trajectory, series of operations, and/or the like for moving from the starting state toward the desired goal state so as to maximize the reward for the task. In some examples, goal-oriented task module 140 may include one or more neural networks. In some examples, goal-oriented task module 140 may solve goal-oriented tasks such as point-maze navigation, ant maze navigation using hierarchical reinforcement learning, image manipulation, 3D construction using blocks, and/or the like as is described in further detail below.

In some examples, memory 120 may include non-transitory, tangible, machine readable media that includes executable code that when run by one or more processors (e.g., processor 110) may cause the one or more processors to perform the methods described in further detail herein. In some examples, self-balancing rewards training module 130 and/or goal-oriented task module 140 may be implemented using hardware, software, and/or a combination of hardware and software.

As discussed above and further emphasized here, FIG. 1 is merely an example which should not unduly limit the scope of the claims. One of ordinary skill in the art would recognize many variations, alternatives, and modifications. According to some embodiments, self-balancing rewards training module 130 and/or goal-oriented task module 150 may be located in separate computing devices. In some examples, each of the separate computing devices may be consistent with computing device 100.

Figure 2:
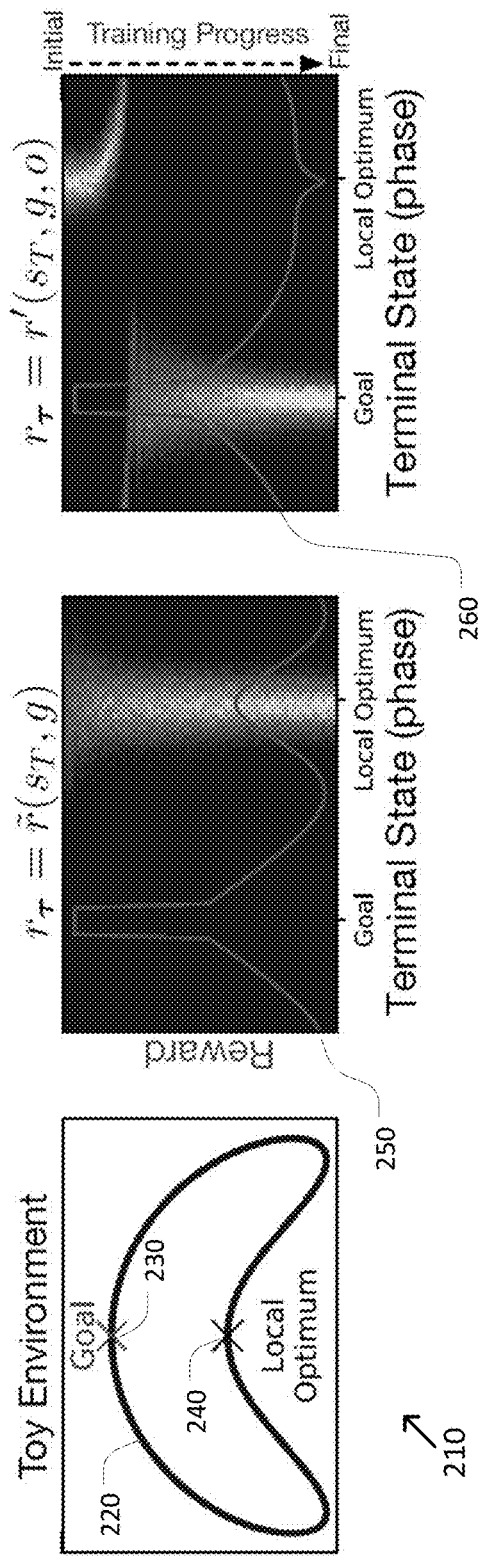
FIG. 2 is a simplified diagram of a goal-oriented task according to some embodiments.

FIG. 2 is a simplified diagram of a goal-oriented task according to some embodiments. As shown in FIG. 2, a toy environment 210 includes a warped circular track 220. The goal of toy environment 210 is to navigate along track 220 from a random starting point on track 220 with a goal of reaching a goal point 230. In some examples, toy environment 210 may be evaluated using a distance to goal function (e.g., a Euclidean distance between a point on track 220 and goal point 230). Use of a distance to goal function, however, hampers navigation to goal point 230 because of a local optimum 240 where navigation may become stuck such that goal point 230 may not be reached. This is especially true for starting points along the bottom half of track 220. For example, a corresponding generic sparse reward function for problems like the goal-orient task of toy environment 210 may be the function r(s, g) as shown in Equation 1, where s is state (e.g., a point on track 220), g is a goal state (e.g., goal point 230), d(s, g) is a distance measure, and δ is a distance threshold indicating how close to goal state g that state s must be to receive a sparse reward. In some examples, d(s, g) may be a Euclidean distance measure in $\mathbb{R}^+$.

$$r(s, g) = \begin{cases} 1, & d(s, g) \leq \delta \\ 0, & \text{otherwise} \end{cases} \quad \text{Equation 1}$$

In some examples, the distance function d may also be used to formulate a shaped reward function without any domain-specific knowledge by adding a penalty to the reward function of Equation 1 when a terminal state $s_T$ of a navigation trajectory for the goal-oriented task does not get sufficiently close to the goal state. An example of using the distance function d in a shaped reward function is shown in Equation 2.

$$\tilde{r}(s, g) = \begin{cases} 1, & d(s, g) \leq \delta \\ -d(s, g), & \text{otherwise} \end{cases} \quad \text{Equation 2}$$

According to some embodiments, even when a shaped reward function is used, this does not guarantee that the impacts of local optima are properly accounted for. For example, and as shown in FIG. 2 where reward function $\tilde{r}(s, g)$ is shown by reward curve 250, the terminal state for starting points/states in the lower half of track 220 have a strong tendency to cluster around local optimum 240.

According to some embodiments, domain-specific knowledge (e.g., in the form of the location of local optimum 240), may be used to develop a shaped reward function that rewards progress towards a goal state while also rewarding for staying away from a local optimum (e.g. as an anti-goal). An example of using the distance function d in a shaped reward with an anti-goal is shown in Equation 3, where $\bar{s}$ corresponds to the local optimum. In some examples, Equation 3 could be modified to include additional anti-goals by adding additional terms to avoid other local optima. For example, and as shown in FIG. 2 where reward function r'(s, g) is shown by reward curve 260, the terminal state for starting points/states in the lower half of track 220 initially cluster around local optimum 240, but as training of the goal-oriented task module continues, the terminal states develop a strong tendency to drift away from local optimum 240 and to eventually cluster around goal point 230.

$$r'(s, g) = \begin{cases} 1, & d(s, g) \leq \delta \\ \min[0, -d(s, g) + d(s, \bar{s})], & \text{otherwise} \end{cases} \quad \text{Equation 3}$$

According to some embodiments, discovering the local optima for many goal-oriented tasks is not as simple as the examples of toy environment 210. In some examples, the local optima may be difficult to detect and/or may require extensive domain-specific knowledge and engineering. In some examples, when the anti-goals are not developed carefully, they may introduce new local optima, which further complicate the development of the shaped reward function. Further, the reliance on domain-specific knowledge to develop anti-goals to avoid the local optima is not conducive to a generic solution to goal-oriented tasks having local optima.

According to some embodiments, a sibling rivalry approach provides a generic solution for goal-oriented tasks having local optima. The sibling rivalry approach provides a way to introduce anti-goals that do not require domain-specific knowledge of the goal-oriented task or the local optima for the goal-oriented task. With sibling rivalry, two trajectories from a randomly selected start state toward a randomly selected goal state are traversed until a terminal state is reached. The terminal states for each trajectory then become the anti-goal for the other trajectory. In some examples and under the assumption that the trajectory with the terminal state closest to the goal state provides a good estimate for a local optimum, allows the sibling rivalry approach to make reasonable guesses regarding local optima and to incorporate that into the training strategy for a goal-oriented task in a generic fashion and without having to develop domain-specific knowledge. In some examples, the use of the sibling rivalry trajectories to provide the anti-goals for each other also turns the r'(s, g) function of Equation 3 into a self-balancing shaped reward function that provides an effective balance between a tendency to exploit an available reward (through −d(s, g)) and the exploring of diverse states (through d(s, $\bar{s}$)).

Figure 3:
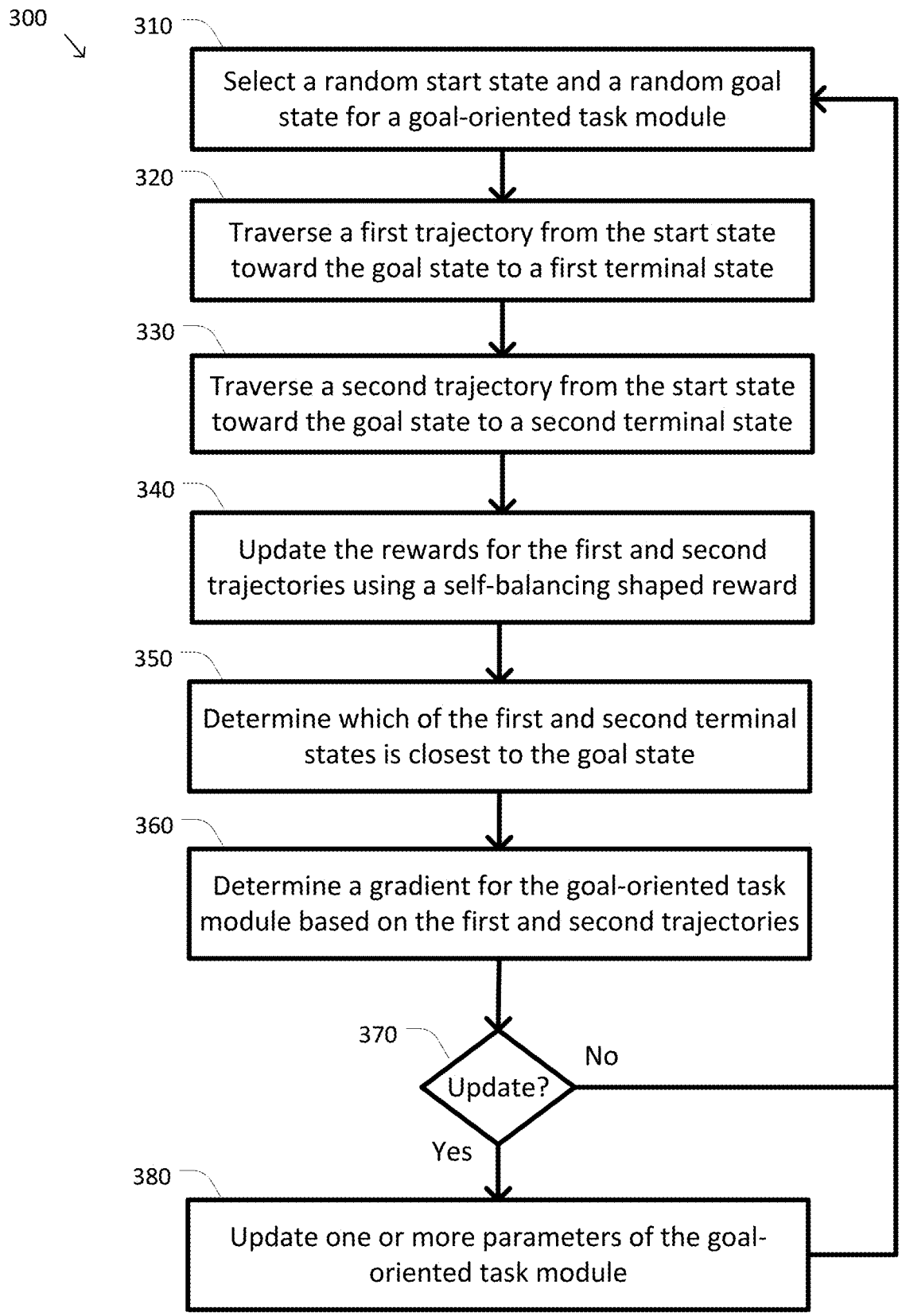
FIG. 3 is a simplified diagram of a method of training a goal-oriented task module according to some embodiments.

FIG. 3 is a simplified diagram of a method 300 of training a goal-oriented task module according to some embodiments. One or more of the processes 310-380 of method 300 may be implemented, at least in part, in the form of executable code stored on non-transitory, tangible, machine-readable media that when run by one or more processors may cause the one or more processors to perform one or more of the processes 310-380. In some embodiments, method 300 may correspond to the method used by self-balancing rewards training module 130 to train a goal-oriented task module, such as goal-oriented task module 140. In some embodiments, method 300 may include additional processes, which are not shown in FIG. 3. In some embodiments, the order of processes 310-380 in method 300 may be different than is implied by FIG. 3. In some examples, processes 320 and 330 may be performed concurrently and/or in a different order. In some examples, processes 340 and 350 may be performed concurrently and/or in a different order.

At a process 310, a random start state and a random goal state for a goal-oriented task module are selected. The goal-oriented task module is a trainable module for solving a goal-oriented task. In some examples, the goal-oriented task module may include one or more neural networks and/or other trainable structure. In some examples, the goal-oriented task may be the goal-oriented task of FIG. 2, other goal-oriented tasks as described below, and/or the like. In some examples, the random start state and the random goal state provide a mechanism for effectively exploring the solution space of the goal-oriented task.

At a process 320, a first trajectory from the start state toward the goal state is traversed to a first terminal state. In some examples, the first trajectory is sometimes referred to as a first rollout. The first trajectory is traversed by applying a policy of the goal-oriented task module to take iterative steps starting at the start state with a goal of reaching the goal state. The first trajectory continues until the first terminal state for the first trajectory is reached. In some examples, the first terminal state may be reached after a configurable number of iterations. In some examples, the configurable number of iterations is five, although other numbers of iterations are possible. In some examples, the first terminal state may be reached after the first trajectory converges to the first terminal state. In some examples, the first trajectory and/or the first terminal state may be evaluated according to a goal such as distance function d, reward function r, reward function $\tilde{r}$, and/or the like.

At a process 330, a second trajectory (or second rollout) from the start state toward the goal state is traversed to a second terminal state. In some examples, the second trajectory is determined and/or evaluated using an approach similar to process 320 until the second terminal state is reached. In some examples, the second trajectory may be different from the first trajectory and/or the second terminal state may be different from the first terminal state because the goal-oriented task module includes one or more probabilistic aspects such that with each iteration along a trajectory, the direction of the iteration is not entirely deterministic. In some examples, the second trajectory is referred to as a sibling of the first trajectory and vice versa.

At a process 340, the rewards for the first and second trajectories are updated using a self-balancing shaped reward. In some examples, the updating of the reward may be referred to as relabeling. In some examples, the self-balancing shaped reward introduces an anti-goal based on the terminal state of the other of the trajectories. That is, the first terminal state becomes an anti-goal for the second trajectory and the second terminal state becomes an anti-goal of the first trajectory. In some examples, function r' is used to determine the self-balancing shaped reward.

At a process 350, it is determined which of the first and second terminal states is closest to the goal state. In some examples, the distance function d may be used to determine how close each of the first and second terminal states is to the goal state.

At a process 360, a gradient for the goal-oriented task module is determined based on the first and second trajectories. The trajectory from among the first and second trajectories whose terminal state is farthest from the goal state is included in the determination of the gradient. In some examples, when the first terminal state and the second terminal state are within a configurable distance $\in$ of each other (e.g., using distance function d), the trajectory from among the first and second trajectories whose terminal state is closest to the goal state is also included in the determination of the gradient. In some examples, when the terminal state that is closest to the goal state is within a configurable distance δ of the goal state (e.g., using distance function d), the trajectory from among the first and second trajectories whose terminal state is closest to the goal state is also included in the determination of the gradient. In some examples, an appropriate loss function for the goal-oriented task module is applied to a trajectory to determine its contribution to the gradient.

At a process 370, it is determined whether sufficient pairs of sibling trajectories have been examined to provide a reasonable estimate of the gradient. In some examples, processes 310-360 are repeated a configurable number of times before the estimated gradient is used to update the goal-oriented task module. When there are insufficient pairs of sibling trajectories, method 300 returns to process 310 to generate another pair of sibling trajectories. When there are sufficient pairs of sibling trajectories, the goal-oriented task module is updated using a process 380.

At the process 380, one or more parameters of the goal-oriented task module are updated. In some examples, the one or more parameters may be updated using back propagation based on the gradient determined during process 360. In some examples, the back propagation may be implemented using a learning algorithm, such as stochastic gradient descent (SGD), adaptive moment estimation (ADAM), and/or the like.

After the one or more parameters of the goal-oriented task module are updated, method 300 may be repeated for additional groups of random start and goal states by returning to process 310.

FIG. 4 is a simplified diagram of method 300 in algorithmic form according to some embodiments. As shown in FIG. 4, an algorithm 400 corresponding to method 300 is shown for a goal-oriented task module applying a policy π for a goal-oriented/goal-reaching task. The max episode length is the number of iterations for traversing a trajectory until the terminal state for that trajectory is reached. The parameter 6 corresponds to the distance threshold used by reward functions r, r̃, and r' and as used in process 360 to determine whether to include the trajectory from among the first and second trajectories whose terminal state is closest to the goal state is also included in the determination of the gradient. The inclusion threshold E corresponds to the distance used to determine whether the first terminal state and the second terminal state are sufficiently close together.

Line 410 of algorithm 400 corresponds to process 310, where a random goal state g and a random start state $s_0$ are selected. Line 420 corresponds to process 320, where a first trajectory $\tau^a$ is traversed to a terminal state $s_T^a$. Line 430 corresponds to process 330, where a second trajectory $\tau^b$ is traversed to a terminal state $s_T^b$. Lines 440 correspond to process 340, where the rewards for the first and second trajectories are updated/relabeled. Lines 450 correspond to process 350, where the terminal states of the first trajectory $\tau^a$ and second trajectory $\tau^b$ are examined to determine which is closer to goal state g, with the trajectory having its terminal state closest to goal g being identified by $\tau^c$ and the trajectory having its terminal state farthest from goal g being identified by $\tau^f$. Lines 460 correspond to process 360, where the trajectory having the terminal state $s_T^f$ farthest from goal g is included in the gradient (e.g., included in buffer D) and the trajectory having the terminal state $s_T^c$ closest to goal g is included in the gradient when it is within the inclusion threshold ∈ of terminal state $s_T^f$ or is within distance δ of goal g. Line 470 corresponds to process 380, where the one or more parameters of the goal-oriented task module are updated using the gradient (e.g., the examples in D) according to the learning algorithm $\mathbb{A}$.

Figure 5:
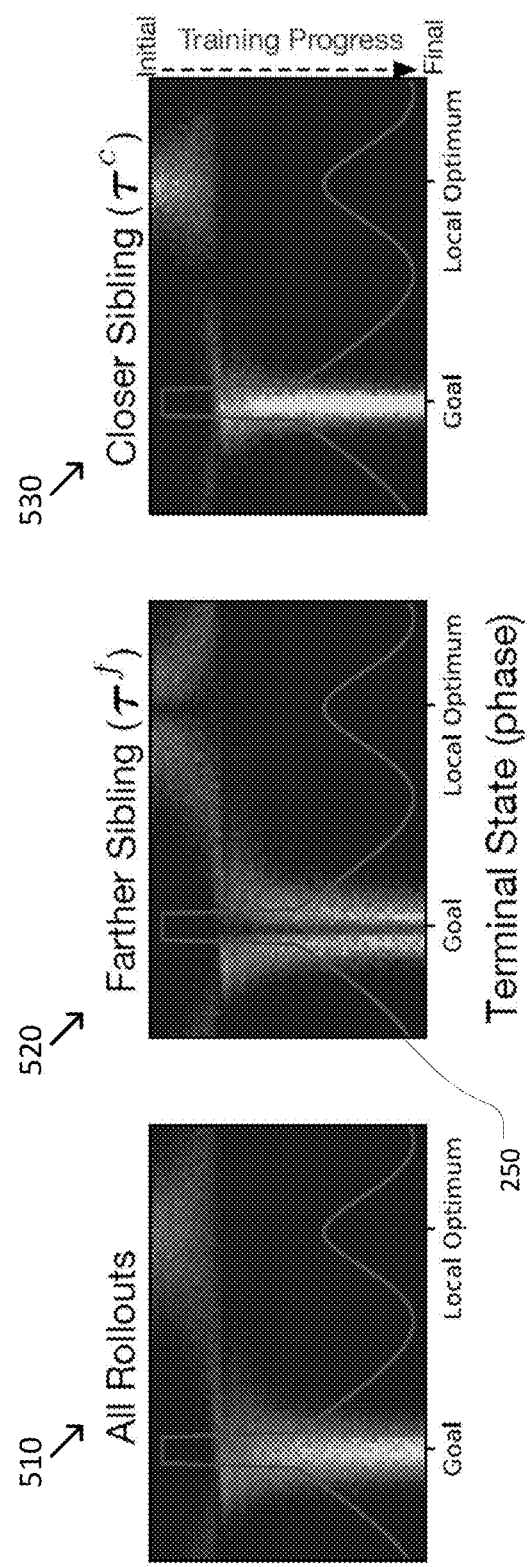
FIG. 5 is a simplified diagram of the impact of training a goal-oriented task module for the goal-oriented task of FIG. 2 according to the method of FIG. 3 and/or the algorithm of FIG. 4 according to some embodiments.

FIG. 5 is a simplified diagram of the impact of training a goal-oriented task module for the goal-oriented task of FIG. 2 according to method 300 and/or algorithm 400 according to some embodiments. As shown in FIG. 5, plot 510 shows that the terminal state for both of the sibling trajectories for starting points/states in the lower half of track 220 initially cluster around local optimum 240 (but more weakly so than in the examples of FIG. 2), but as training of the goal-oriented task module continues, the terminal states develop a strong tendency to drift away from local optimum 240 and to eventually cluster around goal point 230. Plot 520 shows that the terminal states for the trajectory ($\tau^f$) having a terminal state farther from the goal cluster weakly around the goal state as training progresses. Additionally, plot 520 shows that the terminal states for the trajectory ($\tau^c$) having a terminal state closest to the goal cluster more strongly around the goal state as training progresses. Thus, FIG. 5 shows that toy environment 210, when trained according to method 300 and/or algorithm 400 and without any domain-specific knowledge regarding local optimum 240, is able to learn to avoid local optimum 240 and reach goal point 230 almost as well as reward curve 260, which was developed using domain-specific knowledge regarding local optimum 240.

FIG. 6 is a simplified diagram of a 2D point maze goal-oriented task 610 and learning by a corresponding goal-oriented task module according to some embodiments. As shown in FIG. 6, for 2D point maze goal-oriented task 610, the goal state is randomly selected from within the shaded box in the upper right corner and the start state is randomly selected from within the shaded box in the lower left corner. The lines in plot 620 show the learning progress for the success rate (e.g., reaching the goal state) as learning progresses over the training episodes and epochs for various training algorithms, which are described in further detail below. The shaded regions about the plot lines show a distribution of the success rate corresponding to the average plus up to one standard deviation about the average success rate. The shaded points in diagram 630 illustrate the terminal states achieved by the various algorithms after each of the first 15 evaluation checkpoints.

According to some embodiments, 2D point maze goal-oriented task 610 is implemented in a 10×10 environment (arbitrary units) consisting of an array of pseudo-randomly connected 1×1 squares. The construction of the maze ensures that all squares are connected to one another by exactly one path. This is a continuous environment. The goal-oriented task module sees as input its 2D coordinates and well as the 2D goal coordinates, which are somewhere near the top right corner of the maze. The goal-oriented task module takes an action in a 2D space that controls the direction and magnitude of the step it takes, with the outcome of that step potentially affected by collisions with walls. In some examples, the goal-oriented task module does not observe the walls directly, creating a difficult exploration environment. In some examples, the actor and critic networks are learned with three hidden layers of size 128 and rectified linear unit (ReLU) activation functions. According to some embodiments, additional environment and task details for 2D point maze goal-oriented task 610 are shown in FIGS. 13 and 14, respectively.

When a goal-oriented task module for 2D point maze goal-oriented task 610 is trained using Proximal Policy Optimization (PPO) and a shaped distance-to-goal reward, the goal-oriented task module consistently learns to exploit the corridor at the top of the maze but never reaches the goal state. PPO is described in further detail in Schulman, et al. "Proximal Policy Optimization Algorithms," 2017, available at https://arxiv.org/abs/1707.06347, which is incorporated by reference herein in its entirety. A goal-oriented task module incorporating the sibling rivalry approach of method 300 and/or algorithm 400 (PPO-SR) avoids the local optimum of the corridor at the top of the maze (and well as other local optima) and is able to discover the path to the goal state, thus solving the maze. A goal-oriented task module trained according to Hindsight Experience Replay (HER) applies off-policy learning to relabel trajectories based on achieved goals on a DDPG backbone (DDPG-HER) only learns to reach the goal on 1 of the 5 experimental runs, suggesting a failure in exploration because the achieved goals do not generalize to the task goals. HER is described in further detail in Andrychowicz, et al., "Hindsight Experience Replay," 2017 Conference on Neural Information Processing Systems, and DDPG is described in further detail in Lillicrap, et al., "Continuous Control with Deep Reinforcement Learning," 2016 International Conference on Learning Representations, each of with is incorporated by reference herein in its entirety. A goal-oriented task module trained according to curiosity-based intrinsic reward (PPO+ICM), which maintains a curriculum of exploration, fails to discover the sparse reward at the same rate. ICM is described in further detail in Pathak, et al., "Curiosity-driven Exploration by Self-supervised Prediction," 2017 International Conference on Machine Learning and Burda, et al., "Large-Scale Study of Curiosity-Driven Learning," 2018, available at https://arxiv.org/abs/1808.04355, each of with is incorporated by reference herein in its entirety. In addition (although not shown), when using the random network distillation of Burda, the goal-oriented task module never finds the goal. Thus, only the goal-oriented task module that learns with PPO-SR is able to consistently and efficiently solve the maze.

FIG. 7 is a simplified diagram of a U-shaped ant maze goal-oriented task 710 and learning by a corresponding goal-oriented task module according to some embodiments. As shown in FIG. 7, for U-shaped ant maze goal-oriented task 710, the goal state is randomly selected from within the shaded box in the upper left corner and the start state is near the x in the lower left corner. The lines in plot 720 show the learning progress for the success rate (e.g., reaching the goal state) as learning progresses over the training episodes and epochs for various training algorithms similar to those used for 2D point maze goal-oriented task 610 in FIG. 6. The shaded regions about the plot lines show a distribution of the success rate corresponding to the average plus up to one standard deviation about the average success rate. The shaded points in diagram 730 illustrate the terminal states achieved by the various algorithms after each of the first 15 evaluation checkpoints.

According to some embodiments, U-shaped ant maze goal-oriented task 710 uses a set-up similar to 2D point maze goal-oriented task 610, but trades complexity of the maze for complexity in the navigation behavior. The goal-oriented task module is divided into a high-level policy and low-level policy, where the high-level policy proposes subgoals and the low-level policy rewards for reaching those subgoals. The high-level policy is allowed to propose a new subgoal $g^L$ every 20 environment timesteps. From the perspective of training the low-level policy, each of the 20 environment timesteps with a particular subgoal is treated as its own mini-episode. At the end of the full episode, two epochs of PPO training is performed to improve the low-level policy, using distance-to-subgoal as the reward.

In some examples, the limits of the maze are [−4, 20] in both height and width. In some examples, the goal-oriented task module starts at position (0, 0) and attempts to navigate to goal location $g=(x_g, y_g)$, with coordinates sampled within the range of $x_g \in [-3.5, 3.5]$ and $y_g \in [12.5, 19.5]$. For the goal-oriented task module to see the sparse reward, it must navigate from one end of the U-maze to the other and cannot bootstrap this exploration by learning from goals that occur along the way. In some examples, the learning problem becomes considerably easier when this broad goal distribution is used; but this can be made more difficult by not imposing the assumption that the goal distribution will naturally tile goals from ones that are trivially easy to reach to those that are difficult to reach.

In some examples, at timestep t, the high-level policy provides a 2-dimensional action $a_t \in [-5, 5]$, which is used to compute the subgoal $g_t^L = m(s_t) + a_t$. In some examples, the high-level policy specifies the relative coordinates that the low-level policy should achieve. From the perspective of training the high-level policy, only the timesteps where it takes an action and the result produced by the low-level policy has the effect of having taken the high-level action are considered.

In some examples, both the high-level and low-level actor and critic networks use 3 hidden layers of size 128 and ReLU activation functions. According to some embodiments, additional environment and task details for U-shaped ant maze goal-oriented task 710 are shown in FIGS. 13 and 14, respectively.

The sibling rivalry approach (PPO+SR) easily integrates with hierarchical reinforcement learning (HRL), which can help to solve more difficult problems such as navigation in a complex control environment. HRL is used to solve the U-shaped ant maze goal-oriented task using a MuJoCo ant agent requiring a higher-level policy to propose subgoals based on the current state and the goal of the episode as well as a low-level policy to control the ant agent towards the given subgoal. The MuJoCo ant agent is described in further detail in Todorov, et al., "MuJoCo: A Physics Engine for Model-based Control," 2012 IEEE International Conference on Intelligent Robots and Systems, which is incorporated by reference herein in its entirety. The results when learning to navigate the ant maze corroborate those in the toy environment: learning from the naive distance-to-goal shaped reward r̃ fails because the wall creates a local optimum that policy gradient is unable to escape (PPO). As with the 2D point maze goal-oriented task 610, PPO+SR can exploit the optimum without becoming stuck in it. This is visible in the terminal state patterns over early training as shown in diagram 730. The PPO+ICM trained goal-oriented task module stochastically discovers a path to the goal but at a low rate (2 in 5 experiments). The DDPG+HER trained goal-oriented task module struggles to generalize from its achieved goals to the task goals, perhaps due in part to the difficulties of off-policy HRL. For example, 3 of the 5 DDPG+HER runs eventually discover the goal but do not reach a high level of performance.

Figure 8:
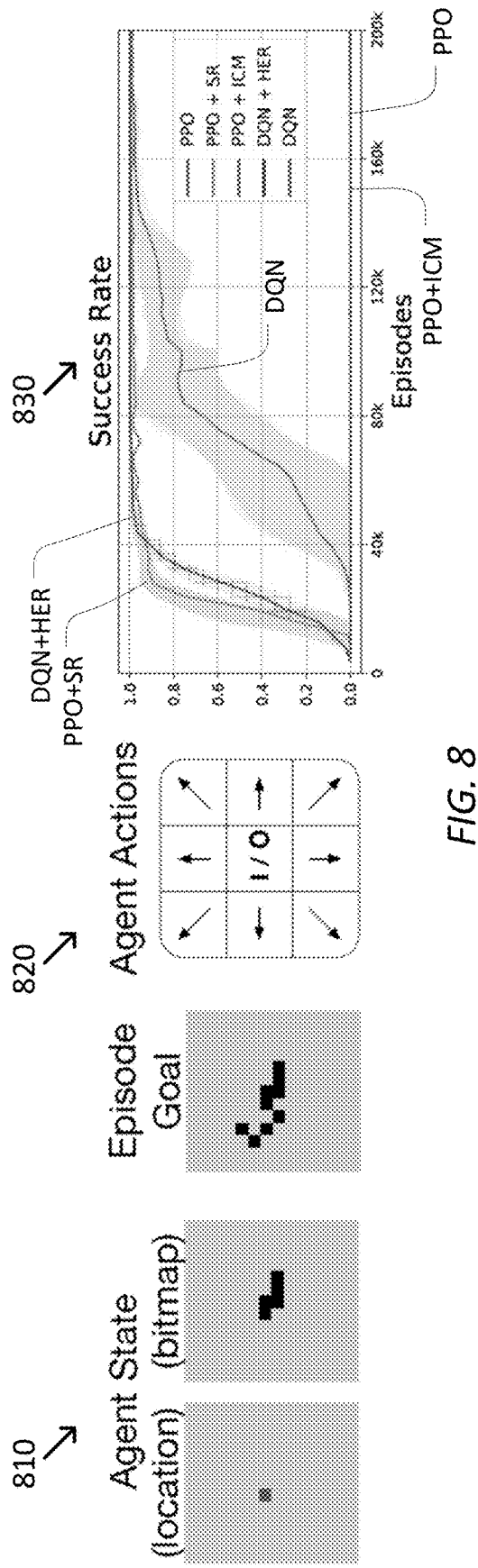

FIG. 8 is a simplified diagram of a 2D discrete pixel-grid goal-oriented task 810 and learning by a corresponding goal-oriented task module according to some embodiments. As shown in FIG. 8, for 2D discrete pixel-grid goal-oriented task 810, the start state is a random location in a 13×13 grid with all the pixels turned off and the goal state is to produce a desired bitmap of off and on pixels. During the trajectories, the goal-oriented task module knows its current location (e.g., via a one-hot bitmap), the current bitmap, and the goal bitmap. The goal-oriented task module succeeds when the bitmap exactly matches the goal bitmap. Diagram 820 shows the possible actions of the goal-oriented task module (toggle bit a current location or move in one of eight directions one pixel). The loss function used is the $L_1$ distance based on the number of pixels that differ between the current bitmap and the goal bitmap.

According to some embodiments, 2D discrete pixel-grid goal-oriented task 810 uses a 2D environment in which interaction with the bit array depends on location. In this setting, the goal-oriented task module begins at a random position on a 13×13 grid with none of its bit array switched on. The goal of the goal-oriented task module is to reproduce the bit array specified by the goal state. In some examples, to develop the random goal states, goal arrays are generating by simulating a simple agent that changes direction every few steps and toggles bits it encounters along the way.

In some examples, 2D convolution layers are used to encode the states and goals. In some examples, the convolution output is pooled using MaxPooling, layer norming is applied, and the hidden state is passed through a fully connected layer to get the actor and critic outputs. According to some embodiments, additional environment and task details for 2D discrete pixel-grid goal-oriented task 810 are shown in FIGS. 13 and 14, respectively.

In 2D discrete pixel-grid goal-oriented task 810, the local optima do not result from having to increase distance in order to ultimately reach the goal, but because the goal-oriented task module tends to increase its distance by toggling a bit from off to on, causing it to quickly avoid taking this action. This has a pathological effect on the learning dynamics and on-policy optimization with a naive distance-based reward shaping never makes progress (PPO). This outcome can be prevented by allowing the goal-oriented task module to learn 2D discrete pixel-grid goal-oriented task 810 using PPO+SR. A deep Q-network (DQN) gradually learns the task when a densified reward is used to augment the terminal state by providing shaped rewards at each step along the trajectories with a discount rate γ=0.98. DQNs are described in further detail in Mnih, et al., "Human-level Control through Deep Reinforcement Learning," Nature 7450, pp. 529-33, 2015, which is incorporated by reference herein in its entirety. Off-policy methods that can accommodate forced exploration may avoid this issue, however, exploration alone is not sufficient on tasks like 2D discrete pixel-grid goal-oriented task 810 because simply achieving diverse states is unlikely to let the goal-oriented task module discover the goal-oriented task so as to properly relate states, goals, and rewards. This is shown by the failure of PPO+ICM to enable learning in this setting. DQN+HER, however, learns the structure of 2D discrete pixel-grid goal-oriented task 810 from failed trajectories and, as an off-policy method, handles forced exploration, allowing it to quickly learn 2D discrete pixel-grid goal-oriented task 810. In some examples, using distance as a reward function automatically exposes the goal-oriented task structure but often at the cost of unwanted local optima. PPO+SR avoids that tradeoff, allowing efficient on-policy learning.

Figure 9:
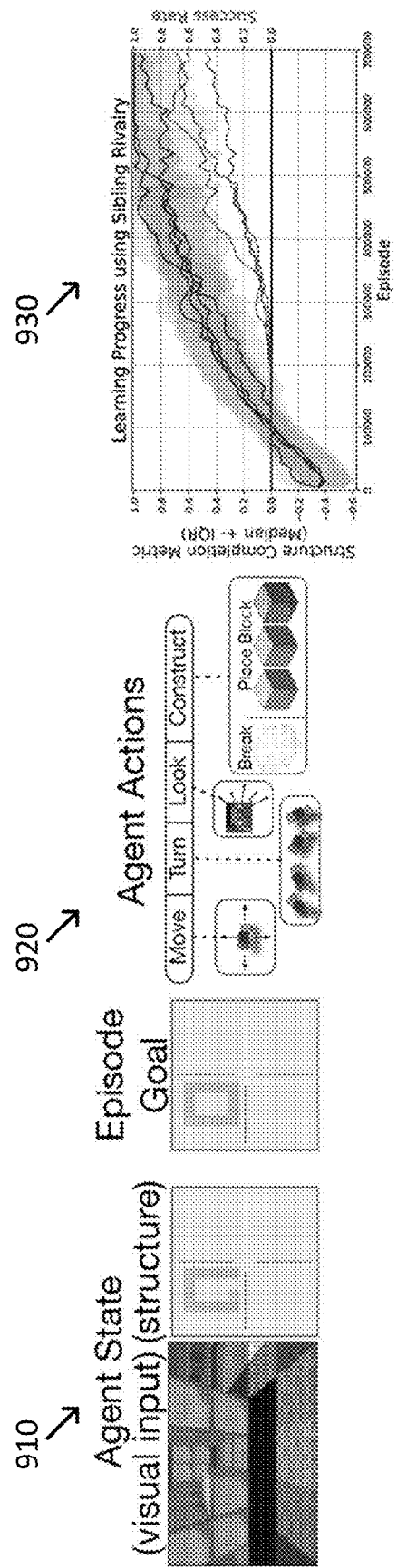

FIG. 9 is a simplified diagram of a construction in Minecraft goal-oriented task 910 and learning by a corresponding goal-oriented task module according to some embodiments. As shown in FIG. 9, for construction in Minecraft goal-oriented task 910, the goal-oriented task module controls both its location and orientation and then breaks or places blocks in order to produce a goal structure. The goal-oriented task module observes its first-person visual input, the discrete 3D cuboid of the construction arena, and the corresponding cuboid of the goal structure. Goal structures vary in height, dimensions, and material (yielding 4806 unique combinations). A goal-oriented task is considered complete when the structure exactly matches the goal structure. In some examples, the goal-oriented task module is trained against a loss function based on a difference between correctly and incorrectly placed blocks divided by the number of goal-structure blocks. As shown in the Example of FIG. 9, the goal-oriented task module has nearly constructed the goal, which specifies a height-2 diamond structure near the top left of the construction arena.

According to some embodiments, construction in Minecraft goal-oriented task 910 includes the goal-oriented task module placed at the center of a "build arena'" which is populated in one of several full Minecraft worlds. In some examples, the goal-oriented task module has no task-specific incentive to explore the outer world but is free to do so. The goal-oriented task module navigates the build arena by controlling its view and orientation in order to reproduce the structure provided as a goal state (which is similar to a 3D version of 2D discrete pixel-grid goal-oriented task 810 but with richer mechanics and more than one type of block that can be placed). In some examples, each of the goal states specifies a square structure made of a single block type that is either 1 or 2 blocks high with corners at randomly chosen locations in the build arena. In some examples, each sampled goal is selected randomly, but is limited so that it includes no more than 34 total blocks (to ensure that the goal structure can be built within a 100 timestep episode). The goal-oriented task module begins each episode with the necessary inventory to accomplish the goal. In some examples, the goal structures are always composed of 1 of 3 block types and the goal-oriented task module and begins with 64 blocks of each of those types. In some examples, the goal-oriented task module may place other block types if it finds them.

In some examples, the agent is able to observe the first-person visual input of the character it controls as well as the 3D cuboid of the goal structure and the 3D cuboid of the current build arena. The goal-oriented task module, thus, has access to the structure it has accomplished but uses the visual input to determine the next actions to direct further progress toward the goal state.

In some examples, the visual input is processed through a shallow convolution network. In some examples, the cuboids, which are represented as 3D tensors of block-type indices, are embedded through a learned lookup and processed via 3D convolution. In some examples, the combined hidden states are used as inputs to the policy network. In some examples, the value network uses separate weights for 3D convolution (but it also takes the anti-goal cuboid as input) but shares the visual encoder with the policy. In some examples, the reward is computed as the change in the distance produced by placing a single block. In some examples, the reward uses a discount rate of γ=0.99. In some examples, this additional densification of the reward produces faster training in this complex environment. According to some embodiments, additional environment and task details for construction in Minecraft goal-oriented task 910 are shown in FIGS. 13 and 14, respectively.

Similar to 2D discrete pixel-grid goal-oriented task 810, the goal-oriented task module produces a discrete goal structure by placing and removing blocks. However, construction in Minecraft goal-oriented task 910 introduces the challenge of a first-person 3D environment, combining continuous and discrete inputs, and application of aggressively asynchronous training with distributed environments using an IMPALA framework. The IMPALA framework is described in further detail in Espeholt, et al., "IMPALA: Scalable Distributed Deep-RL with Importance Weighted Actor-Learner Architectures," 2018 International Conference on Machine Learning, which is incorporated by reference herein in its entirety. Because success requires exact-match between the goal and constructed cuboids, the distance metric is based on a number of block-wise differences relative to the goal structure. Using this distance metric as a naive shaped reward causes the goal-oriented task module to avoid ever placing blocks within roughly 1000 episodes, which is not shown for visual clarity. As shown in plot 930, by incorporating sibling rivalry into the learning, the goal-oriented task module avoids this local optimum and learns to achieve a high degree of construction accuracy and rate of exact-match success.

Figure 10:
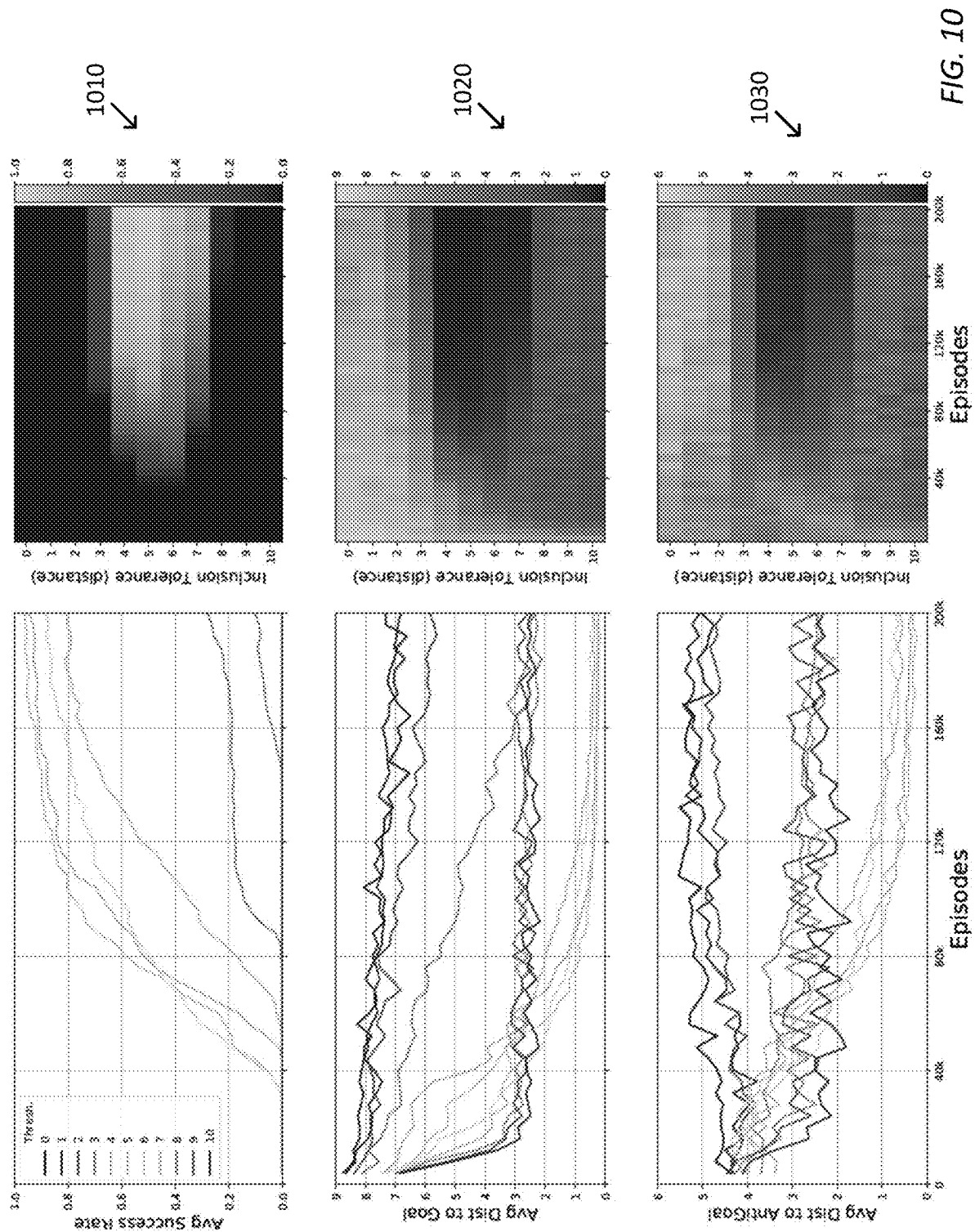
FIG. 10 is a simplified diagram of the impact of the inclusion threshold used in the method of FIG. 3 and/or the algorithm of FIG. 4 according to some embodiments.

FIG. 10 is a simplified diagram of the impact of the inclusion threshold E used in method 300 and/or algorithm 400 according to some embodiments. The inclusion threshold E is the distance threshold for when to include the trajectory ($\tau^c$) whose terminal state is closest to the goal state in the determination of the gradient used to update the one or more parameters of the goal-oriented task module. When the inclusion threshold E=0, trajectory $\tau^c$ is only included if it reaches the goal state g. Conversely, when E=∞, trajectory $\tau^c$ is always included in the determination of the gradient, while still encouraging diversity through the augmented reward function r'. In some examples, the inclusion threshold E may be used to tune learning towards exploration or exploitation of the distance-to-goal reward.

This is most evident in the impact of the inclusion threshold E on learning progress for the 2D point maze goal-oriented task 610, where local optima are numerous. FIG. 10 shows the results of a set of experiments for each value of inclusion threshold E in the range of 0, 1, 2, . . . , 10 distance units. Because the 2D point maze is 10×10, this range of inclusion threshold ∈ values, gives good coverage of options one might consider for the 2D point maze goal-oriented task 610. As shown in FIG. 10, there are three modes of learning: over-exploration (∈ too low), successful learning, and under-exploration (E too high). Over-exploration, occurs for the lower range of inclusion threshold ∈ where closer-to-goal trajectories are more aggressively discarded. Close inspection shows slow progress towards the goal and a tendency to increase inter-sibling distance (the latter trend appears to reverse near the end of the training window). Successful behavior occurs for the mid-range of inclusion threshold ∈, where the goal-oriented task module may exploit the distance-to-goal signal but maintains enough diversity in its state distribution to avoid commitment to local optima. Under-exploration, occurs for the higher range of inclusion threshold ∈, where inclusion of the closer-to-goal trajectory is more permissive. Under-exploration leads the goal-oriented task module to the same pitfall that prevents learning from naive distance-to-goal shaped rewards in that the goal-oriented task module quickly identifies a low-distance local optimum (consistently, the top corridor of the maze in toy environment 210) and does not sufficiently explore in order to find a higher-reward region of the maze.

As further shown in FIG. 10, plot and heatmap 1010 shows that the average success rate is highest for inclusion threshold ∈ equal to 4, 5, or 6. Plot and heatmap 1020 shows that the average distance to goal is lowest for inclusion threshold ∈ equal to 4, 5, 6, or 7. Plot and heatmap 1030 shows that the average distance to the anti-goal (e.g., the terminal state of the sibling trajectory) is lowest for inclusion threshold ∈ equal to 4, 5, 6, or 7. In some examples, it is likely that a coarser search over possible values of inclusion threshold ∈ would be suitable to identify the optimal range for inclusion threshold ∈.

Many of the results described with respect to FIG. 6-9 use PPO as the backbone learning algorithm. According to some embodiments, PPO has strong performance and because it is well suited for the constraints imposed by the application of the sibling rivalry approach. More specifically, the sibling rivalry approach examines the results for multiple sibling rivalry trajectories (e.g., M as shown in algorithm 400) before updating one or more of the parameters of the goal-oriented task module. PPO handles this well as it is able to make multiple updates from a large batch of trajectories. In some examples, while experimental variants (e.g., PPO, and PPO+ICM) that do not use the sibling rivalry approach, may be implemented without scheduling updates according to full trajectories, the comparisons of FIG. 6-9 do not do so. More specifically, for the goal-oriented task modules trained using PPO and PPO variants, there is a general cycle between collection of full trajectories and multiple optimization epochs over minibatches of transitions within those trajectories. For comparison, a constant number of optimization epochs and updates per epoch are used while the sizes of the minibatches are varied based on the variable length of trajectories (due to either episode termination after goal-reaching or trajectory exclusion when using PPO-SR.

To avoid results due to edge-case hyperparameter configurations, the PPO approach is standardized as much as possible by using manual search to identify such generally useful parameter settings. In the U-shaped ant maze goal-oriented task 710, this standardized approach applies specifically to training the high-level policy. PPO is also used to train the low-level policy but a more specific approach for that is adopted based on its unique role in the results of FIG. 6-9.

For PPO variants, the output head of the policy network specifies the $\alpha \in \mathbb{R}^2$ and $\beta \in \mathbb{R}^2$ control parameters of a Beta distribution to allow sampling actions within a truncated range are used. These are described in further detail in Chou, et al., "Improving Stochastic Policy Gradients in Continuous Control with Deep Reinforcement Learning using the Beta Distribution," 2017 International Conference on Machine Learning, which is incorporated by reference herein in its entirety. The samples values are shifted and scaled to correspond to the task action range. Entropy regularization is also used to prevent the policy from becoming overly deterministic early during training.

ICM is implemented consistent with the guidelines provided in Burda, et al., "Large-Scale Study of Curiosity-Driven Learning," 2018, available at https://arxiv.org/abs/1808.04355, each of with is incorporated by reference herein in its entirety. The curiosity-driven intrinsic reward is weighted by 0.01 compared to the sparse reward. In some examples, ICM is only accompanied by sparse extrinsic rewards, meaning that ICM only experiences the intrinsic rewards until it (possibly) discovers the goal region. During optimization, the curiosity network modules (whose architectures follow similar designs to the policy and value for the given goal-oriented task) is trained at a rate of 0.05 compared to the policy and value network modules.

FIG. 11 is a simplified diagram of implementation parameters for PPO and its variants according to some embodiments. As shown in FIG. 11, the various implementation parameters for PPO, PPO-SR, and PPO-ICM for goal-oriented tasks 610, 710, and 810, as discussed with respect to FIGS. 6-8, are listed.

FIG. 12 is a simplified diagram of implementation parameters for off-policy approaches according to some embodiments. As shown in FIG. 12, the various implementation parameters for the off-policy approaches for DDPG+HER and DQN+HER for goal-oriented tasks 610, 710, and 810, as discussed with respect to FIGS. 6-8, are listed.

Some examples of computing devices, such as computing device 100 may include non-transitory, tangible, machine readable media that include executable code that when run by one or more processors (e.g., processor 110) may cause the one or more processors to perform the operations of method 300 and/or algorithm 400. Some common forms of machine readable media that may include the operations of method 300 and/or algorithm 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached documents ("Keeping Your Distance: Solving Sparse Reward Tasks using Self-Balancing Shaped Rewards," 16 pp.), which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a goal-oriented task module implemented on one or more hardware processors for performing a reward learning task, comprising:
  randomly selecting, by the one or more hardware processors, a start state and a goal state corresponding to a training task for the goal-oriented task module comprising one or more neural networks;
  traversing, by the one or more hardware processors, a first trajectory for moving from the start state toward the goal state, the first trajectory ending at a first terminal state;
  traversing, by the one or more hardware processors, a second trajectory for moving from the start state toward the goal state, the second trajectory ending at a second terminal state, the first terminal state being closer to the goal state than the second terminal state is to the goal state;
  updating a first reward for the first trajectory using a self-balancing reward function based on the second terminal state;
  updating a second reward for the second trajectory using the self-balancing reward function based on the first terminal state;
  determining, by the one or more hardware processors, a gradient for the goal-oriented task module, wherein the second trajectory contributes to the determination of the gradient and wherein the first trajectory contributes to the determination of the gradient when at least one of the following is true: (i) the first terminal state and the second terminal state are within a first threshold distance of each other, and (ii) the first terminal state is within a second threshold distance from the goal state;
  training the goal-oriented task module by updating and storing one or more parameters of the goal-oriented task module at a memory based on the gradient;
  generating, by the trained goal-oriented task module, in response to an input indicating an initialized start state and a desired goal state of a goal-oriented task, a series of operations; and
  outputting, via a communication interface, the series of operations to an execution system that executes the series of operations to move a system state from the initialized start state to the desired goal state.

2. The method of claim 1, wherein the first terminal state is an anti-goal for the second trajectory.

3. The method of claim 1, wherein the first terminal state provides an estimate of a local optimum.

4. The method of claim 1, wherein updating the first reward for the first trajectory using the self-balancing reward function comprises rewarding the first trajectory when the first terminal state is within the second threshold distance of the goal state.

5. The method of claim 1, wherein updating the first reward for the first trajectory using the self-balancing reward function comprises:
   penalizing the first trajectory based on a distance between the first terminal state and the goal state; and
   rewarding the first trajectory based on how close the first terminal state is to the second terminal state.

6. The method of claim 1, further comprising iteratively determining the first threshold distance.

7. The method of claim 1, wherein traversing the first trajectory comprises iterating along the first trajectory for a configurable number of iterations.

8. The method of claim 1, wherein traversing the first trajectory comprises iterating along the first trajectory until the first trajectory converges at the first terminal state.

9. The method of claim 1, further comprising selecting multiple start and goal state pairs and evaluating multiple first and second trajectory pairs before updating the one or more parameters of the goal-oriented task module.

10. A non-transitory machine-readable medium comprising executable code for training a goal-oriented task module for performing a reward learning task, which when executed by one or more processors associated with a computing device are adapted to cause the one or more processors to perform a method for training a goal-oriented task module, comprising:
   randomly selecting, by the one or more hardware processors, a start state and a goal state corresponding to a training task for the goal-oriented task module comprising one or more neural networks;
   traversing, by the one or more hardware processors, a first trajectory for moving from the start state toward the goal state, the first trajectory ending at a first terminal state;
   traversing, by the one or more hardware processors, a second trajectory for moving from the start state toward the goal state, the second trajectory ending at a second terminal state, the first terminal state being closer to the goal state than the second terminal state is to the goal state;
   updating a first reward for the first trajectory using a self-balancing reward function based on the second terminal state;
   updating a second reward for the second trajectory using the self-balancing reward function based on the first terminal state;
   determining, by the one or more hardware processors, a gradient for the goal-oriented task module, wherein the second trajectory contributes to the determination of the gradient and wherein the first trajectory contributes to the determination of the gradient when at least one of the following is true: (i) the first terminal state and the second terminal state are within a first threshold distance of each other, and (ii) the first terminal state is within a second threshold distance from the goal state;
   training the goal-oriented task module by updating and storing one or more parameters of the goal-oriented task module at a memory based on the gradient;
   generating, by the trained goal-oriented task module, in response to an input indicating an initialized start state and a desired goal state of a goal-oriented task, a series of operations; and
   outputting, via a communication interface, the series of operations to an execution system that executes the series of operations to move a system state from the initialized start state to the desired goal state.

11. The non-transitory machine-readable medium of claim 10, wherein the first terminal state is an anti-goal for the second rollout.

12. The non-transitory machine-readable medium of claim 10, wherein the first terminal state provides an estimate of a local optimum.

13. The non-transitory machine-readable medium of claim 10, wherein updating the first reward for the first rollout using the self-balancing reward function comprises rewarding the first rollout when the first terminal state is within the second threshold distance of the goal state.

14. The non-transitory machine-readable medium of claim 10, wherein updating the first reward for the first rollout using the self-balancing reward function comprises:
   penalizing the first rollout based on a distance between the first terminal state and the goal state; and
   rewarding the first rollout based on how close the first terminal state is to the second terminal state.

15. The non-transitory machine-readable medium of claim 10, further comprising iteratively determining the first threshold distance.

16. The non-transitory machine-readable medium of claim 10, wherein traversing the first rollout comprises:
   iterating along the first rollout for a configurable number of iterations; or
   iterating along the first rollout until the first rollout converges at the first terminal state.

17. A device comprising:
   a memory storing parameters of a goal-oriented task module and executable code for training the goal-oriented task module; and
   one or more processors configured to execute the executable code to perform a method of training a goal-oriented task module for performing a reward learning task, the method comprising:
   randomly selecting a start state and a goal state corresponding to a training task for the goal-oriented task module comprising one or more neural networks;
   traversing a first trajectory for moving from the start state toward the goal state, the first trajectory ending at a first terminal state;
   traversing a second trajectory for moving from the start state toward the goal state, the second trajectory ending at a second terminal state, the first terminal state being closer to the goal state than the second terminal state is to the goal state;
   updating a first reward for the first trajectory using a self-balancing reward function based on the second terminal state;
   updating a second reward for the second trajectory using the self-balancing reward function based on the first terminal state;
   determining a gradient for the goal-oriented task module, wherein the second trajectory contributes to the determination of the gradient and wherein the first trajectory contributes to the determination of the gradient when at least one of the following is true: (i) the first terminal state and the second terminal state are within a first threshold distance of each other, and (ii) the first terminal state is within a second threshold distance from the goal state;

training the goal-oriented task module by updating and storing one or more parameters of the goal-oriented task module at the memory based on the gradient; and generating, by the trained goal-oriented task module, in response to an input indicating an initialized start state and a desired goal state of a goal-oriented task, a series of operations; and a communication interface that outputs the series of operations to an execution system that executes the series of operations to move a system state from the initialized start state to the desired goal state.

18. The device of claim 17, wherein to update the first reward for the first trajectory using the self-balancing reward function, the one or more processors are configured to reward the first trajectory when the first terminal state is within the second threshold distance of the goal state.

19. The device of claim 17, wherein to update the first reward for the first trajectory using the self-balancing reward function, the one or more processors are configured to:
    penalizing the first trajectory based on a distance between the first terminal state and the goal state; and
    rewarding the first trajectory based on how close the first terminal state is to the second terminal state.

20. The device of claim 17, wherein to traverse the first trajectory, the goal-oriented task module is configured to:
    iterate along the first trajectory for a configurable number of iterations; or
    iterate along the first trajectory until the first trajectory converges at the first terminal state.

* * * * *